(12) United States Patent
Grover et al.

(10) Patent No.: US 11,798,149 B2
(45) Date of Patent: Oct. 24, 2023

(54) REMOVING REFLECTED INFORMATION FROM WITHIN A VIDEO CAPTURE FEED DURING A VIDEOCONFERENCE

(71) Applicant: Plantronics, Inc., Santa Cruz, CA (US)

(72) Inventors: Jonathan Grover, San Jose, CA (US); Cary Arnold Bran, Seattle, WA (US)

(73) Assignee: Plantronics, Inc., Santa Cruz, CA (US)

( * ) Notice: Subject to any disclaimer, the term of this patent is extended or adjusted under 35 U.S.C. 154(b) by 117 days.

(21) Appl. No.: 17/453,114

(22) Filed: Nov. 1, 2021

(65) Prior Publication Data

US 2023/0140114 A1    May 4, 2023

(51) Int. Cl.
*H04N 7/15* (2006.01)
*G06T 5/50* (2006.01)
*G06T 7/70* (2017.01)
*G06T 5/00* (2006.01)
*G06T 3/60* (2006.01)
*G06V 10/22* (2022.01)
*G06V 20/40* (2022.01)
*G06V 40/16* (2022.01)

(52) U.S. Cl.
CPC ............... *G06T 5/50* (2013.01); *G06T 3/608* (2013.01); *G06T 5/003* (2013.01); *G06T 7/70* (2017.01); *G06V 10/22* (2022.01); *G06V 20/48* (2022.01); *G06V 40/171* (2022.01); *H04N 7/15* (2013.01); *G06T 2207/10016* (2013.01); *G06T 2207/20132* (2013.01); *G06T 2207/20224* (2013.01)

(58) Field of Classification Search
CPC .... G06T 5/00; G06T 7/70; G06T 5/50; G06T 3/60; H04N 7/15; H04N 7/147; H04L 65/403

USPC .......................................... 348/14.01–14.16
See application file for complete search history.

(56) References Cited

U.S. PATENT DOCUMENTS

| | | | |
|---|---|---|---|
| 2007/0291231 A1 | 12/2007 | Hammoud | |
| 2020/0186727 A1* | 6/2020 | Denoue | G06V 40/20 |
| 2022/0318954 A1* | 10/2022 | Wu | G06V 10/82 |
| 2023/0022986 A1* | 1/2023 | Pranger | H04N 21/4318 |

OTHER PUBLICATIONS

P. Drozdowski, F. Struck, C. Rathgeb and C. Busch, "Detection of Glasses in Near-Infrared Ocular Images," 2018 International Conference on Biometrics (ICB), 2018, pp. 202-208, doi: 10.1109/ICB2018.2018.00039.

Kuruvilla, V. P., "Fuzzy matching or fuzzy logic algorithms explained" Nanonets Automate Data Capture, AI; Machine Learning Blog. (Aug. 5, 2021). Retrieved Nov. 9, 2021, from https://nanonets.com/blog/fuzzy-matching-fuzzy-logic/.

Sandhan, Tushar and Jin Young Choi. "Anti-Glare: Tightly Constrained Optimization for Eyeglass Reflection Removal." 2017 IEEE Conference on Computer Vision and Pattern Recognition (CVPR) (2017): 1675-1684.

(Continued)

*Primary Examiner* — Melur Ramakrishnaiah
(74) *Attorney, Agent, or Firm* — QUARLES & BRADY LLP (57) ABSTRACT

Systems and methods for detecting information displayed by a display device and reflected into a camera feed are disclosed. Described systems and methods remove the reflected information from the camera feed so that unintended disclosure of private information when the camera feed is shared can be prevented.

20 Claims, 5 Drawing Sheets

(56) References Cited

OTHER PUBLICATIONS

Connelly Barnes, Eli Shechtman, Adam Finkelstein, and Dan B Goldman. "PatchMatch: A Randomized Correspondence Algorithm for Structural Image Editing." ACM Transactions on Graphics (Proc. SIGGRAPH) 28(3), Aug. 2009.
Gibbs, W. W. "How to Steal Secrets Without a Network: How hackers can steal secrets from reflections." Scientific American. vol. 300, Issue 5, pp. 58-63; Retrieved Nov. 9, 2021, from https://www.scientificamerican.com/article/hackers-can-steal-from-reflections/.

* cited by examiner

REMOVING REFLECTED INFORMATION FROM WITHIN A VIDEO CAPTURE FEED DURING A VIDEOCONFERENCE

BACKGROUND OF THE INVENTION

Field of the Invention

The present invention relates generally to videoconferencing and relates particularly to systems and methods to prevent displayed private information from being reflected inadvertently detected and shared by an image capture device during a videoconference.

Description of the Related Art

During a videoconference, people at a videoconferencing endpoint interact with people at one or more other videoconferencing endpoints. Such interaction involves using a camera device at a first endpoint to capture image data frames for transmission to a remote endpoint. During a videoconference, a person at a videoconferencing endpoint often sits at a display, such as a computer monitor, which displays, among other things, people at a different endpoint. Also at the videoconferencing endpoint, is an image capture device such as a camera, which captures images of the person for transmission to the remote endpoint. If the person wears glasses, the image that is displayed by the monitor may be reflected by the glasses towards the image capture device. The image capture device would then provide a video feed that would contain the reflection, which can be undesirable.

It is therefore desirable to have an improved mechanism for detecting and removing reflections from the captured feed prior to transmission to the remote endpoint.

SUMMARY OF THE INVENTION

To improve the videoconferencing experience, this disclosure describes systems, methods, and devices for removing reflected information from one or more captured images before those images are, for example, transmitted for viewing at a remote endpoint.

In one embodiment, a method for removing reflected information from within a video capture feed provided, where the method includes: displaying a first frame of visual data using a display device, the first frame of visual data corresponding to one or more first images; capturing a second frame of visual data using an image capture device; searching, by a processor, for one or more second images in the second frame of visual data corresponding to the one or more first images; detecting, by the processor, a second image in the second frame of visual data corresponding to the one or more first images; generating a third frame of visual data by modifying the second frame of visual data, wherein modifying the second frame of visual data includes removing from the second frame at least some visual data corresponding to the second image; and including the third frame of visual data within a visual data stream for rendering by an electronic device such as a local display device or a display device at a remote endpoint.

Another embodiment provides a teleconferencing system that includes: a display device; an image capture device configured to capture a series of image data frames; a processor coupled to the image capture device and the display device, and configured to process the series of image data frames; and a non-transitory computer-readable storage medium storing computer program code executable by the processor, the computer program code comprising computer program code instructions configured to: display a first frame of visual data using the display device, the first frame of visual data corresponding to one or more first images; capture a second frame of visual data using an image capture device; search for one or more second images in the second frame of visual data corresponding to the one or more first images; detect a second image in the second frame of visual data corresponding to the one or more first images; generate a third frame of visual data by modifying the second frame of visual data, wherein modifying the second frame of visual data includes removing from the second frame at least some visual data corresponding to the second image; and include the third frame of visual data within a visual data stream for rendering by an electronic device such as a local display device or a display device at a remote endpoint.

In another embodiment, a non-transitory computer readable medium storing instructions executable by a processor is provided, wherein the instructions comprise instructions to: display a first frame of visual data using a display device, the first frame of visual data corresponding to one or more first images; capture a second frame of visual data using an image capture device; search, by a processor, for one or more second images in the second frame of visual data corresponding to the one or more first images; detect, by the processor, a second image in the second frame of visual data corresponding to the one or more first images; generate a third frame of visual data by modifying the second frame of visual data, wherein modifying the second frame of visual data includes removing from the second frame at least some visual data corresponding to the second image; and include the third frame of visual data within a visual data stream for rendering by an electronic device such as a local display device or a display device at a remote endpoint.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Systems and methods for detecting information displayed by a display device and reflected into a camera feed are disclosed. Systems and methods of the invention remove the reflected information from the camera feed so that unintended disclosure of private information when the camera feed is shared can be prevented. For example, information such as a social security number might be shown on a display monitor during a teleconference and reflected towards the video camera. Systems and methods of the invention search image frames captured by the video camera for the reflected information and remove the reflected information before captured image frames are further processed (e.g., saved to a memory or transmitted to a remote endpoint).

Figure 1:
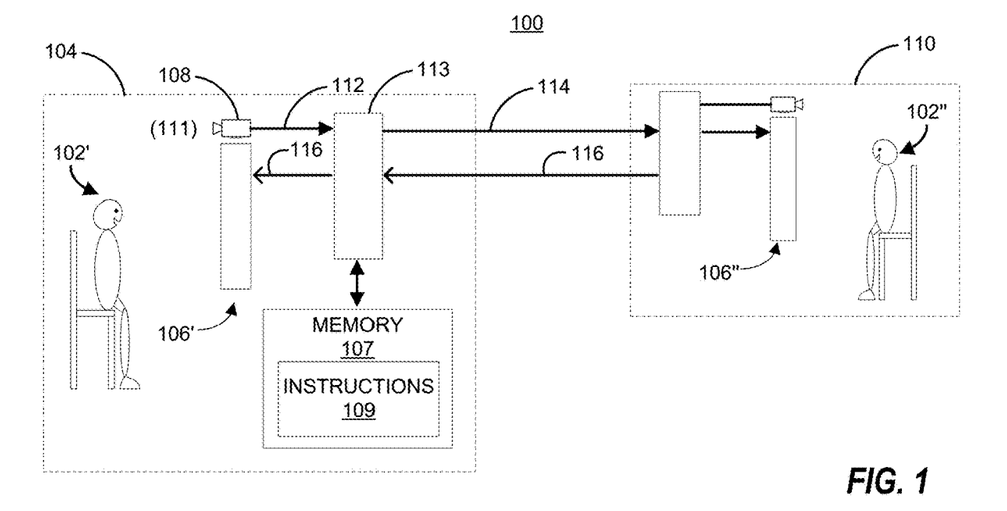
FIG. 1 is a simplified block diagram illustrating a videoconferencing environment in accordance with an embodiment of the invention.

FIG. 1 illustrates a teleconferencing environment 100 in accordance with an embodiment of the invention. A person 102 at a first teleconferencing endpoint 104 sits before a display device 106'. Above the display device 106' is an image capture device 108 (e.g., a camera). The person 102' is participating in a videoconference with a person 102" at a remote endpoint 110. Visual data 112 captured 111 with the image capture device 108 can be processed by a processor 113 and transmitted in a video feed 114 to the remote endpoint 110 for rendering on a display device 106" at the remote endpoint 110. Similarly, visual data can be received 116 from the remote endpoint 110 and displayed on the local display device 106'. The local display device 106' can display other data as well. For example, a portion of a display device 106' may depict the person(s) 102" at the far end 110 while another portion of the display device 106' (or even another display device (not shown) at the endpoint 104 could display additional information. If the person 102' at the endpoint 104 is wearing glasses, the glasses may reflect images from the display(s) 106' which would then be captured 111 by the image capture device 108, and hence transmitted to the remote endpoint 110 as part of the outgoing video feed 114. Aspects of this disclosure are directed to preventing such captured 111 images from being sent to the remote endpoint 110. It will be understood by those of skill in the art that although the main discussion gives eyeglasses as an example of a reflective surface, the invention is applicable if the reflective surface is a glass window wall at the back of a conference room, a glossy white board that would reflect someone's laptop screen, a phone screen, a smart watch, or the like.

The processor 113 is coupled to a memory 107 storing instructions 109 for controlling various functions at the endpoint 104. The memory 107 can be any type of conventional memory 107 such as synchronous dynamic random-access memory and can store instructions 109 in the form of software and firmware for controlling the endpoint 104. The instructions 109 can include instructions for detecting and removing displayed image data from image data frames captured by the image capture device 108.

Figure 2:
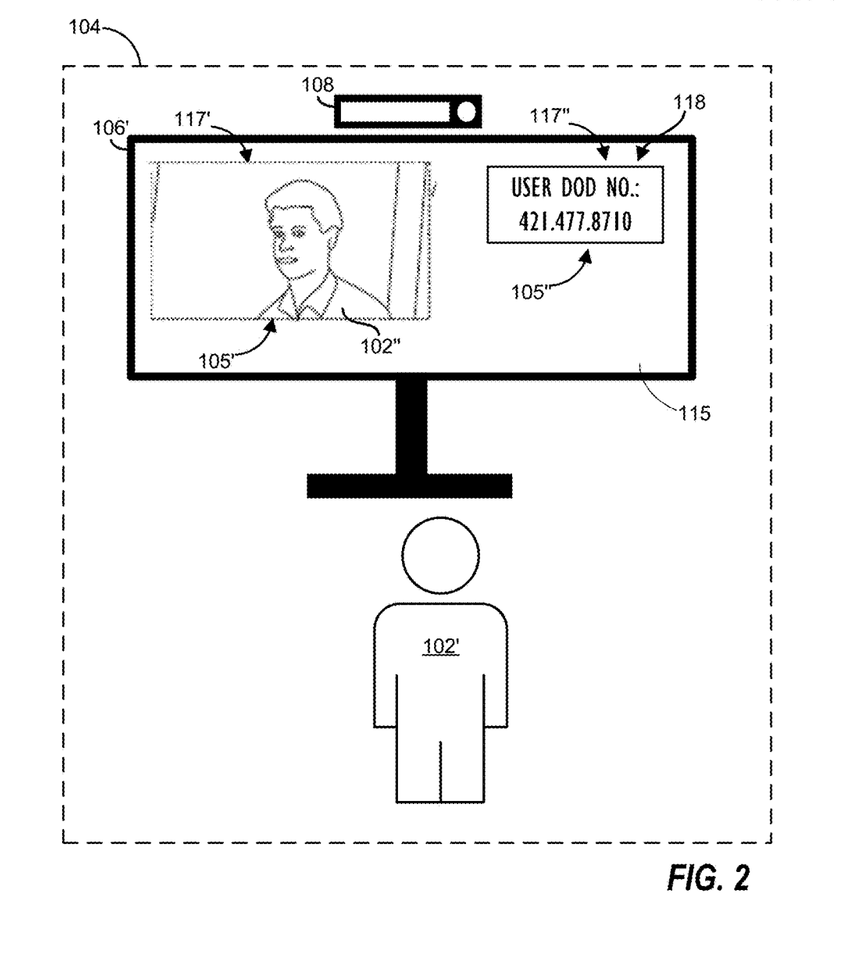
FIG. 2 is a simplified block diagram illustrating a videoconferencing display displaying information to a user at a videoconferencing endpoint of the videoconferencing environment of FIG. 1.

FIG. 2 illustrates a videoconferencing endpoint 104 in which a local participant 102', is viewing a display device 106'. The display device 106' is displaying 117 a frame 115 of visual data. More specifically, the display device 106' is displaying 117' an image 107' of the participant(s) 102" at remote endpoint (110) and is also displaying 117" an image 107" of personal information 118, (e.g., the local participant's Department of Defense Identification number). The image capture device 108 is pointed at local participant 102'. As will be explained in greater detail, the frame 115 can also be stored for further use or modification so that the personal information 118 will not be unintentionally shared outside the endpoint 104.

Figure 3:
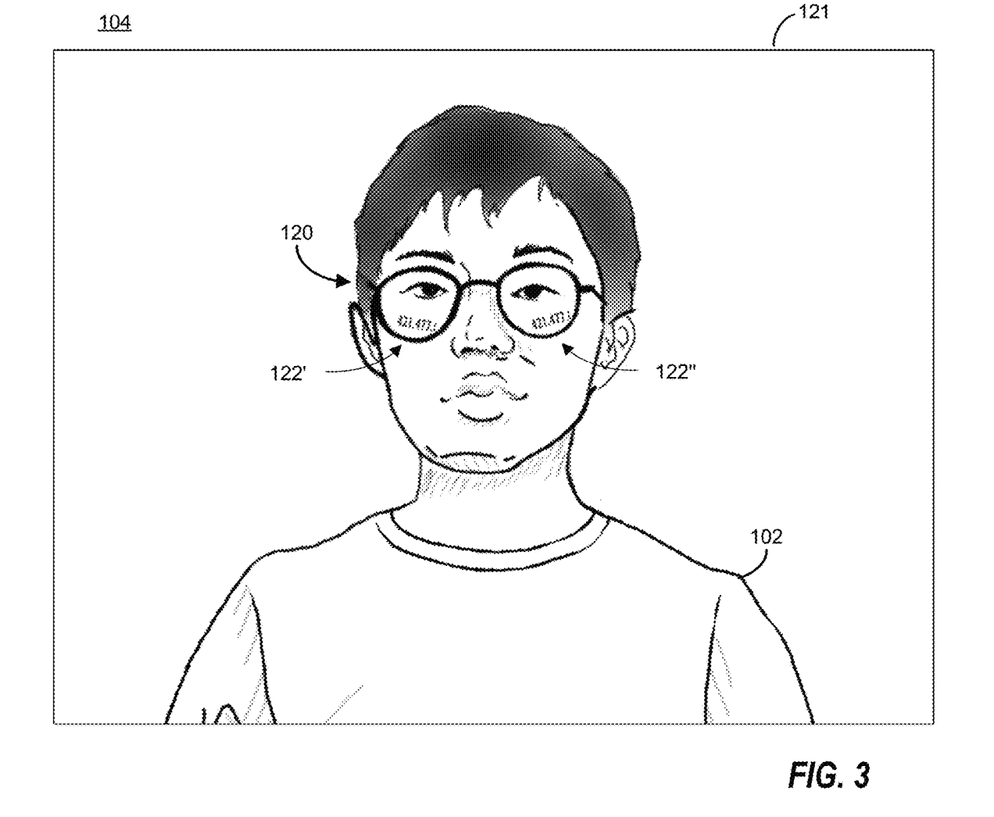
FIG. 3 illustrates the videoconferencing endpoint of FIG. 2 from the point of view of a video capture device of the videoconferencing endpoint.

FIG. 3 illustrates the videoconferencing endpoint 104 from the point of view of the image capture device (108) at the endpoint 104. More particularly, FIG. 3 illustrates a frame 121 of visual data captured (111) by the image capture device (108). The local participant 102 is wearing glasses 120, and some information 122', 122"—a portion of the local participant's Department of Defense No.—displayed (117") on the display device (106') is being reflected into the image capture device (108). Systems and methods of the invention are directed to searching for and locating this information 122', 122" within visual data frames 121 of captured video (112). Systems and methods of the invention are further directed to generating modified visual data frames in which captured private information 122', 122" has been removed and then sending a video feed (114) of the modified visual data frames to a remote endpoint (110), thereby preventing the displayed private information 118 from being transmitted to the remote endpoint (110) and displayed (117) on the display (106") at the remote endpoint (110). Again, it will be understood by those of skill in the art that although the main discussion gives eyeglasses as an example of a reflective surface, the invention is applicable if the reflective surface is a glass window wall at the back of a conference room, a glossy white board that would reflect someone's laptop screen, a phone screen, a smart watch, or the like.

Figure 4A:
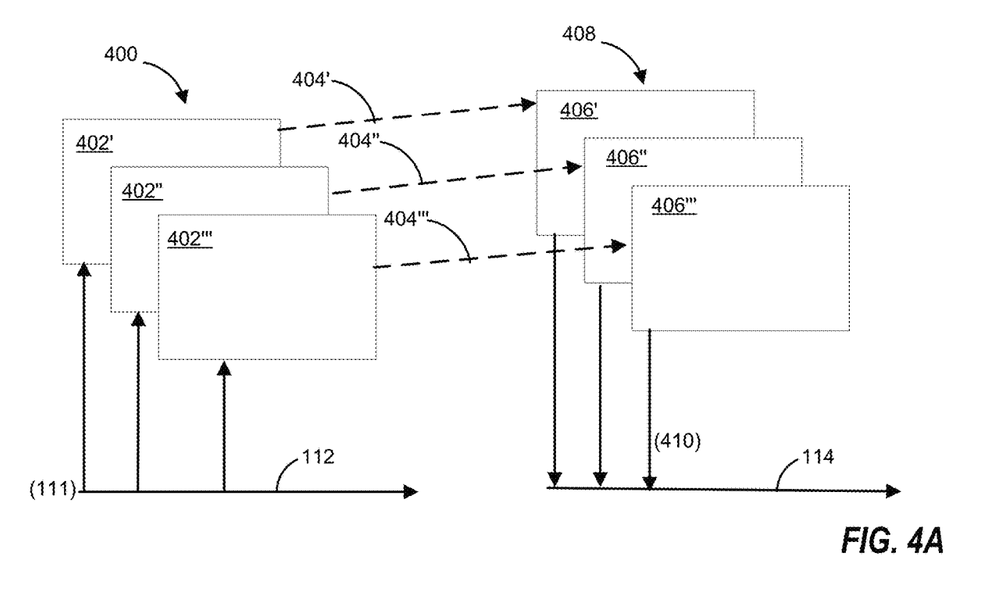
FIG. 4A illustrates aspects of a process of removing reflected information from a series of captured visual data frames in accordance with an embodiment of the invention.

FIG. 4A illustrates a series of frames 400 captured using the image capture device (108) to form a feed of captured video 112. Each captured frame 402 (e.g., 121) is searched for reflected images and the reflected images are removed 404 to form modified frames 406. The series 408 of modified frames 406 are included 410 in outgoing data stream 114 for transmission to a remote endpoint (110).

Figure 4B:
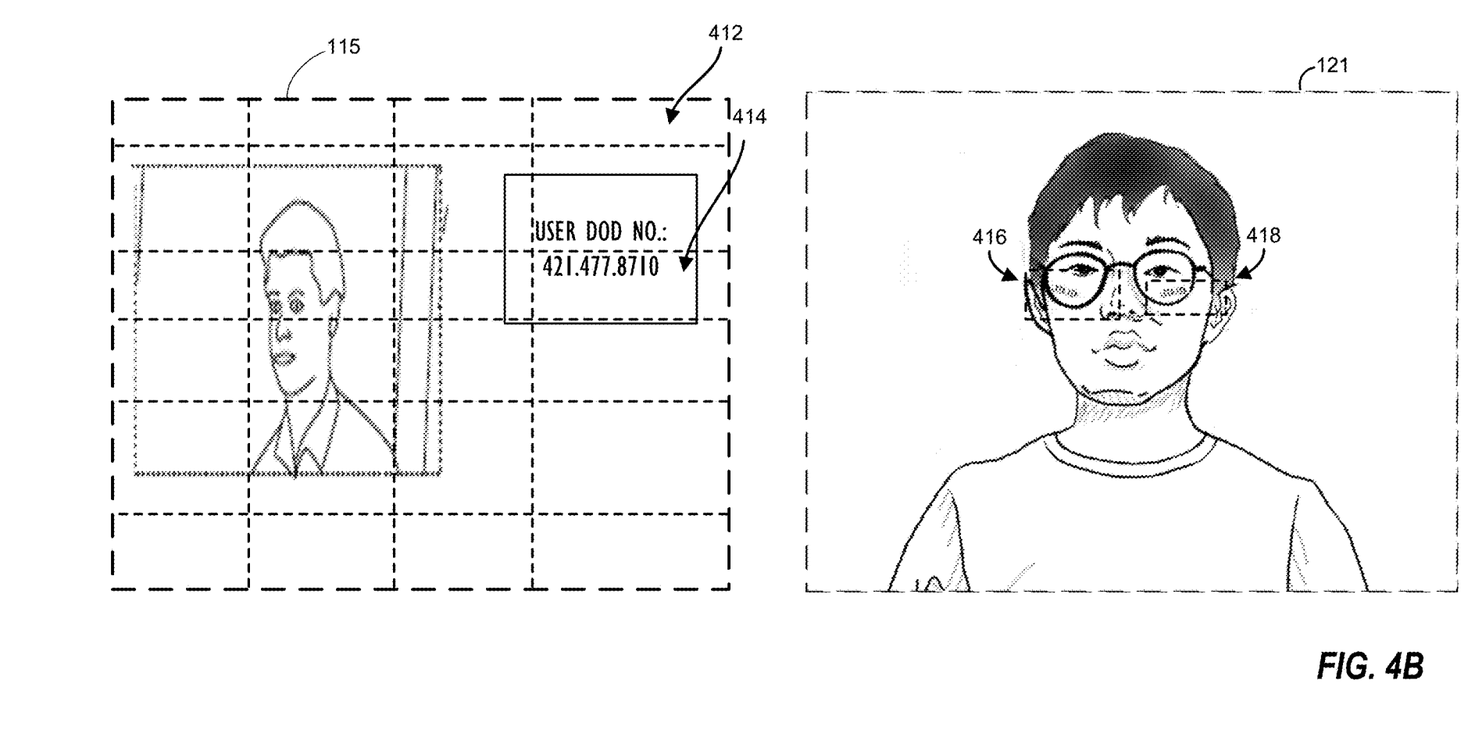
FIG. 4B illustrates aspects of the process of removing reflected information from a series of captured visual data frames in accordance with an embodiment of the invention.

FIG. 4B illustrates a captured image data frame 121 alongside a displayed image data frame 115. As will be explained in greater detail, the displayed image frame 115 can be subdivided into a plurality of search blocks 412. Each search block 412 can be compared to regions in the captured frame 121. In this example, information of block 414 would be located in region 416 and region 418 in frame 121. In some embodiments, prior to searching the captured frame 121, the displayed frame 115 can be transformed. Transforming a frame 115 of displayed data can include performing such operations as cropping the displayed frame 115 of visual data; skewing (rotating) the displayed frame 115 of visual data; modifying an aspect ratio of the frame 115 of visual data (such as from nine by six to four by three); and modifying a transparency level of the first frame of visual data. Additionally, or alternatively, transforming a frame 115 of displayed data can include performing such operations as changing a saturation level of the frame 115 of visual data (e.g., enhancing coloration), changing a blur level of the frame 115 of visual data, and changing a brightness level of the frame of visual data (e.g., making the frame 115 darker or brighter).

Figure 5:
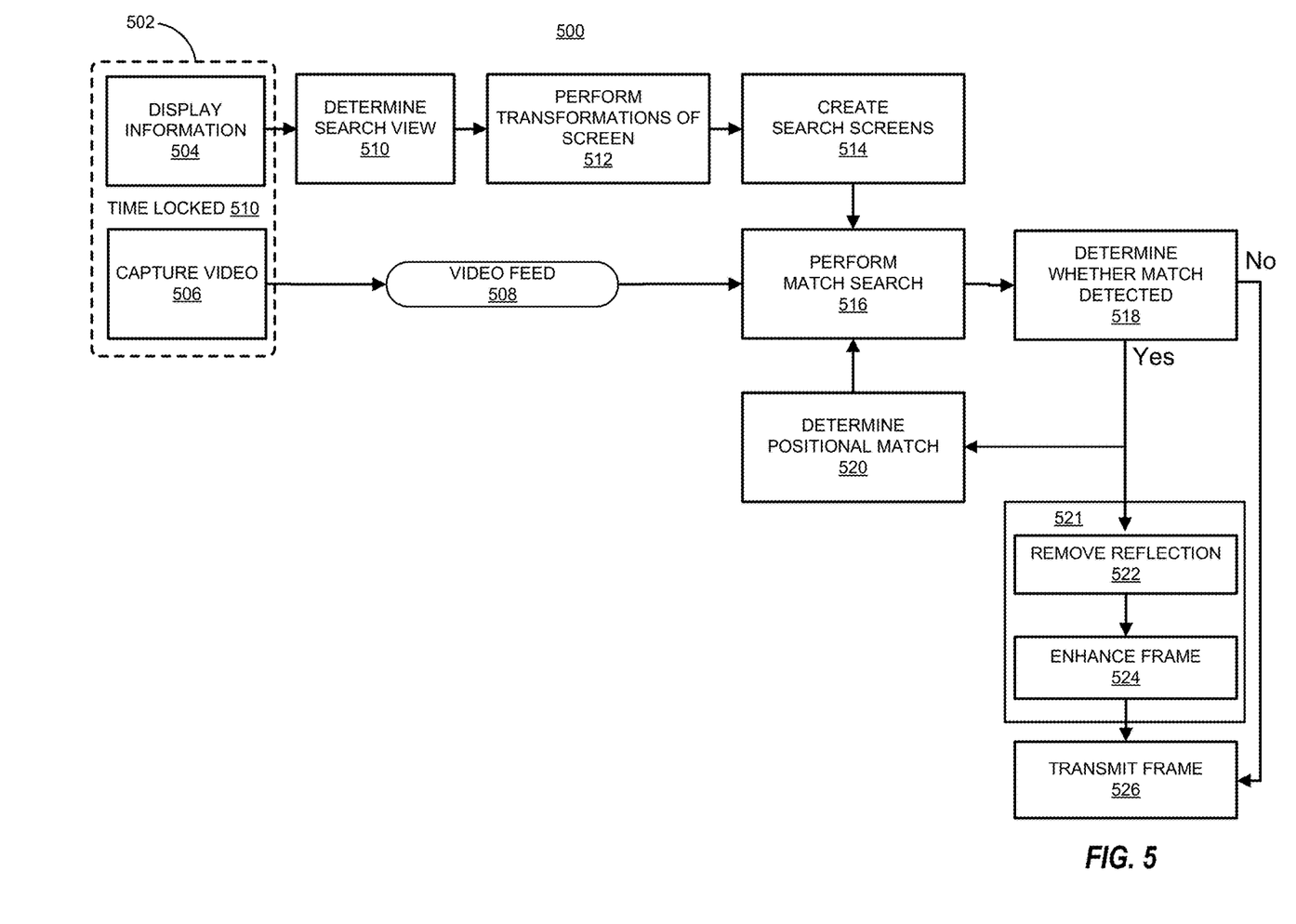
FIG. 5 is a block diagram illustrating a method of removing reflected information from a series of captured visual data frames in accordance with an embodiment of the invention.

FIG. 5 is a block diagram of a method 500 in accordance with an embodiment of the invention. At step 502, video information is displayed 504 (e.g., 117) on a display (106') of an endpoint (104). Also at step 502, visual data is captured 506 (e.g., 111) as a series of frames (e.g., 400) which make up video feed 508 (e.g., 112). The displayed frames (e.g., 115) and the captured frames (e.g., 121) are time locked 510 by a processor (113) at the endpoint (104), meaning that for each captured frame (e.g., 121), the processor (113) designates and tracks the frame (e.g., 115) that was displayed when that frame (e.g., 121) was captured. At step 510, the processor (113) determines the content that is displayed 504 in each displayed frame 115. In some embodiments, step 510 may not be necessary in the sense that the processor (113) may be controlling the display device (106') and thus "knows" what is being displayed (117). For example, some devices include a video pass-through option whereby HDMI input from the CPU of a controlling computing device. passes through the image capture device (108) before the input is displayed on a display. Alternatively, or additionally, a local application running on the processor (113), may have the ability to monitor and track image data that is being displayed on one or more screens in real time. Alternatively, or additionally, other local software or one or more device drivers at the endpoint (104) may be used to access the displayed information through an application programming interface or other programmatic relay.

In some embodiments of the invention, the displayed data frame (115) is transformed 512 and the transformed data is used by the processor (113) to form 514 one or more search blocks. In some embodiments, no transformation is performed, and the processor (113) forms search blocks based on original untransformed display frames (e.g., 115). Whether the search blocks are based on transformed frames or original frames (115), the captured images (e.g., 121, 402) are searched 516 in accordance with the one or more search blocks, as will be explained in greater detail.

As noted, in some embodiments, before the processor (113) forms 514 one or more search blocks based on a frame of displayed data, the processor (113) can perform one or more transformations of the displayed data to make the search of the captured feed more effective. Transforming a frame of displayed data can include performing such operations as skewing the displayed frame of visual data; modifying an aspect ratio of the frame of visual data; and modifying a transparency level of the first frame of visual data. Additionally, or alternatively, transforming a frame of displayed data can include performing such operations as changing a saturation level of the frame of visual data, changing a blur level of the frame of visual data, and changing a brightness level of the frame of visual data.

The processor (113) can use various methods to create 514 search blocks. For example, the processor (113) could subdivide a displayed image data frame (115) into equally sized sub-frames. The processor (113) can then search a corresponding captured frame (121) for a down-scaled version of a sub-frame (414). The processor (113) then determines 518 whether any of the search blocks (412) is found in its corresponding captured frame 121. If no match is detected, the captured frame (121) can be transmitted to a remote endpoint (110). If, on the other hand, a match is detected, the processor (113) will determine 520 the position of the matching block within the captured frame (121). In some embodiments, when the processor (113) searches 516 the next incoming captured frame (121), the processor (113) will begin searching at a location in the incoming frame corresponding to the location (e.g., 416, 418) of the matched block (414) in the present frame, thereby making the search process 516 more efficient. Another way to narrow the search would be for the system to locate faces in the captured frame and compare search blocks with regions containing faces for eyeglass reflections. Another way to narrow the search would be for the system to locate eyeglasses in the captured frame and compare search blocks to regions containing an eyeglass.

Additionally, if the processor locates 518 a search block in the captured image frame (121), the processor (113) can remove 522 (404) the data in the matched portion of the captured frame (121), thereby generating 521 a replacement frame 406. Removing 522 the reflected data (e.g., 122', 122") can be done in various ways available to the person of skill. For example, the area in the captured frame containing the reflected data (122', 122")—the area that matches a search block—can be filled using an auto-fill program or data from previously stored images of the participant 102 could be used to derive suitable fill data. Alternately, in an extreme case, the image capture device (108) could be automatically powered off, or transmission of the video feed to the remote endpoint (110) could be automatically terminated. Once the private information (118) is removed (404) from the data frame, the modified data frame (406) can be enhanced 524 before being transmitted 526 to a remote endpoint (110) as part of a data stream (114). In some embodiments, a warning about the reflected data could be displayed to the near end participant 102, for example, or a notification regarding leaking of classified information could be sent to a system administrator.

Figure 6:
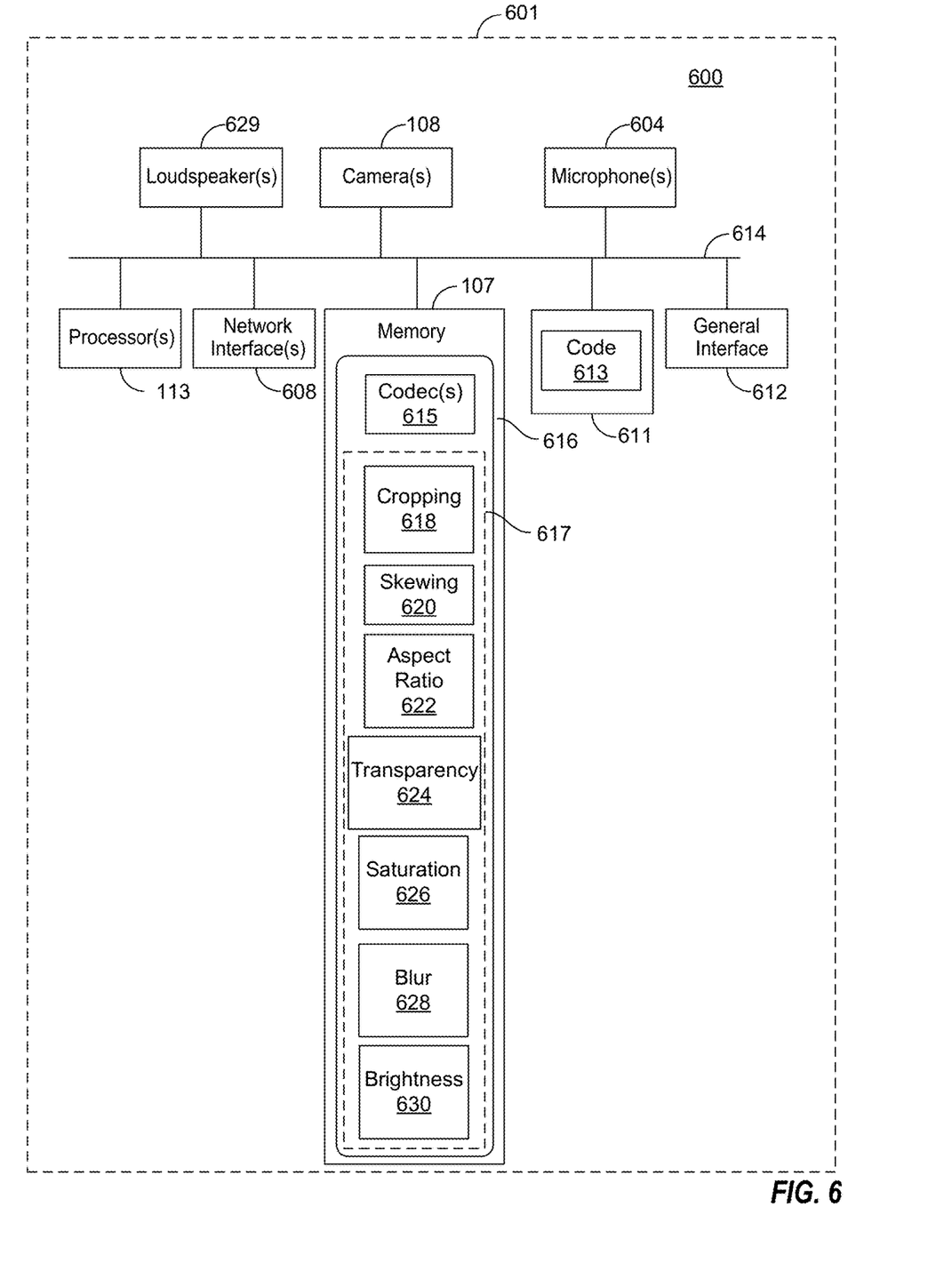
FIG. 6 illustrates aspects of a videoconferencing system of a videoconferencing endpoint operable to perform methods and processes of the invention.

FIG. 6 illustrates aspects of a videoconferencing system 600 of a videoconferencing endpoint 601 (e.g., 104) operable to provide to solutions like that described in the preceding paragraphs. The system 600 includes a loudspeaker 629, EPTZ camera(s) 108 and microphones 604. EPTZ camera 108 is used to capture one or more series of image data frames. Other suitable image capture devices can also be utilized. The system 600 also includes a processor 113, a network interface 608, a memory 107, a storage 611, and an input/output interface 612, all coupled by data bus 614.

The memory 107 can be any type of conventional memory such as synchronous dynamic random-access memory and can store modules 616 in the form of software and firmware for controlling the system 600. (Storage 611 can also store computer program code 613 executable by the processor 113 for controlling the system 600.) Algorithms 617 can include cropping algorithms 618, skewing algorithms 620, aspect ratio algorithms 622, transparency level algorithms 624, saturation level algorithms, as well as blur 628 and brightness algorithms 630. In addition to the described algorithms 617, the modules 616 can include operating systems, a graphical user interface that enables users to control the system 600, and other algorithms for processing audio signals and video signals as well as controlling the camera(s) 108.

The network interface 608 enables communications between the system 600 and remote endpoints (not shown). In one or more embodiments, the general interface 612 provides data transmission with local devices such as a keyboard, mouse, printer, overhead projector, display, external loudspeakers, additional cameras, and microphone pods, etc.

The camera(s) 108 and the microphone(s) 604 capture video and audio, respectively, in the videoconference environment and produce video and audio signals transmitted through the data bus 614 to the processor 113. In at least one embodiment of this disclosure, the processor 113 processes the video and audio using algorithms in the modules 616. The system 600 processes audio captured by the microphones 604 as well as the video captured by the camera(s) 108 to determine the location of participants and control and select from the views of the camera(s) 108. Processed audio and video can be sent to remote devices (e.g., 110) coupled to network interface 608 and devices coupled to general interface 612.

Embodiments of this disclosure include the following examples:

1. A computer-implementable method (500) for removing 522 reflected information (122) from within a video capture feed 112, comprising: displaying 117 a first frame 115 of visual data using a display device 106, the first frame 115 comprising visual data corresponding to one or more first images 105; capturing 111 a second frame 121 of visual data 112 using an image capture device 108; searching 516, by a processor 113, for one or more second images 416 in the second frame 121 of visual data corresponding to one or more of the one or more first images 105; detecting 518, by the processor 113, a second image 416 in the second frame 121 of visual data corresponding to one or more of the one or more first images 105; generating 521 a third frame of visual data by modifying the second frame of visual data, wherein modifying the second frame of visual data includes removing 522 at least some visual data 122 corresponding to the second image 416 from the second frame 121; and including 526 the third frame of visual data within a visual data stream 114 for rendering by an electronic device 106'.

2. The computer-implementable method (500) of example 1, further comprising: determining 520 a location of the second image 416 in the second frame 121 of visual data; displaying 117 a fourth frame 115 of visual data using the display device 106, the fourth frame 115 of visual data corresponding to one or more third images 105; capturing 111 a fifth frame 402 of visual data using the image capture device 108; and searching 516, by the processor 113, for one or more fourth images 418 in the fifth frame 121 of visual data corresponding to the one or more third images 105, wherein searching 516, by the processor 113, for one or more fourth images 418 in the fifth frame of visual data includes initially searching 516 a region of the fifth frame 121 of visual data corresponding to the location 416 of the second image 416 in the second frame 121 of visual image data.

3. The computer-implementable method (500) of example 1, further comprising: transforming 512 the first frame 115 of visual data corresponding to one or more first images 105 by applying one or more image transforms to the first frame 115 of visual data, wherein searching 516, by the processor 113, for one or more second images 416 in the second frame 121 of visual data corresponding to the one or more first images 105 comprises searching 516 for one or more second images 416 in the second frame of visual data corresponding to one or more transformed 512 first images 105.

4. The computer-implementable method (500) of example 3, wherein transforming 512 the first frame of visual data comprises at least one of: cropping 618 the first frame of visual data; skewing 620 the first frame of visual data; modifying 622 an aspect ratio of the first frame of visual data; and modifying 624 a transparency level of the first frame of visual data.

5. The computer-implementable method (500) of example 3, wherein transforming 512 the first frame of visual data comprises at least one of: changing 626 a saturation level of the first frame of visual data; changing 628 a blur level of the first frame of visual data; and changing 630 a brightness level of the first frame of visual data.

6. The computer-implementable method (500) of example 1, wherein including the third frame of visual data within a visual data stream 114 for rendering by an electronic device comprises transmitting 526 the visual data stream 114 to a remote endpoint 110.

7. The computer-implementable method (500) of example 1, wherein including the third frame of visual data within the visual data stream 114 for rendering by an electronic device (106) comprises displaying 117 at least some of the third image frame using the display device 106.

8. The computer-implementable method (500) of example 1, wherein searching 516, by the processor 113, for one or more second images 416 in the second frame 121 of visual data corresponding to one or more of the one or more first images 105 comprises searching for image data depicting an eyeglass and wherein detecting 518, by the processor 113, a second image in the second frame of visual data corresponding to the one or more first images 105 comprises determining that the second image is at least partially bounded by image data depicting the eyeglass 120.

9. A teleconferencing system 600, comprising: a display device 106'; an image capture device 108 configured to capture 111 a series 400 of image data frames; a processor 113 coupled to the image capture device 108 and the display device 106, and configured to process the series 400 of image data frames; and a non-transitory computer-readable storage medium 107 storing instructions 616 executable by the processor 113, wherein the instructions comprise instructions configured to: display 115 a first frame of visual data using the display device 106, the first frame of visual data corresponding to one or more first images 105; capture 111 a second frame of visual data using an image capture device 108; search 516 for one or more second images in the second frame of visual data corresponding to the one or more first images 105; detect 518 a second image in the second frame of visual data corresponding to the one or more first images 105; generate 521 a third frame 406 of visual data by modifying the second frame of visual data, wherein modifying the second frame of visual data includes removing 522 from the second frame at least some visual data corresponding to the second image; and include 410 the third frame 406 of visual data within a visual data stream 114 for rendering by an electronic device (106).

10. The teleconferencing system 600 of example 9, wherein the instructions further comprise instructions to: determine a location of the second image in the second frame of visual image data; display a fourth frame of visual data using the display device 106, the fourth frame of visual data corresponding to one or more third images; capture 111 a fifth frame of visual data using the image capture device 108; and searching 516 for one or more fourth images in the fifth frame of visual data corresponding to the one or more third images, wherein searching 516, by the processor 113, for one or more fourth images in the fifth frame of visual data includes initially searching 516 a region of the fifth frame of visual data corresponding to the location of the second image in the second frame of visual image data.

11. The teleconferencing system 600 of example 10, wherein the instructions further comprise instructions to: transform the first frame of visual data corresponding to one or more first images 105 by applying one or more image transforms to the first frame of visual data, and wherein the instructions to search for one or more second images in the second frame of visual data corresponding to the one or more first images 105 comprises searching 516 for one or more second images in the second frame of visual data corresponding to one or more transformed first images 105.

12. The teleconferencing system 600 of example 11, wherein the instructions to transform the first frame of visual data comprise instructions to: crop 618 the first frame of visual data; skew 620 the first frame of visual data; modify 622 an aspect ratio of the first frame of visual data; and modify 624 a transparency level of the first frame of visual data.

13. The teleconferencing system 600 of example 11, wherein the instructions to transform the first frame of visual data comprise instructions to: change 626 a saturation level of the first frame of visual data; change 628 a blur level of the first frame of visual data; and change 630 a brightness level of the first frame of visual data.

14. The teleconferencing system 600 of example 12, wherein including the third frame of visual data within a visual data stream 114 for rendering by an electronic device (106) comprises transmitting the visual data stream 114 to a remote endpoint.

15. The teleconferencing system 600 of example 9, wherein including the third frame of visual data within a visual data stream 114 for rendering by an electronic device (106) comprises displaying 117 at least some of the third image frame using the display device 106.

16. The teleconferencing system 600 of example 9, wherein detecting 518, by the processor 113, a second image in the second frame of visual data corresponding to the one or more first images 105 comprises determining that the second image is at least partially bounded by image data depicting an eyeglass.

17. A non-transitory computer readable medium 107 storing instructions executable by a processor 113, wherein the instructions comprise instructions to: display a first frame of visual data using a display device 106, the first frame of visual data corresponding to one or more first images 105; capture 111 a second frame of visual data using an image capture device 108; search 516, by a processor 113, for one or more second images in the second frame of visual data corresponding to the one or more first images 105; detect, by the processor 113, a second image in the second frame of visual data corresponding to the one or more first images 105; generate 521 a third frame of visual data by modifying the second frame of visual data, wherein modifying the second frame of visual data includes removing 522 from the second frame at least some visual data corresponding to the second image; and include the third frame of visual data within a visual data stream 114 for rendering by an electronic device (106).

18. The non-transitory computer readable medium 107 of example 17, wherein the instructions further comprise instructions to: determine a location of the second image in the second frame of visual image data; display a fourth frame of visual data using the display device 106, the fourth frame of visual data corresponding to one or more third images; capture 111 a fifth frame of visual data using the image capture device 108; and search 516, by the processor 113, for one or more fourth images in the fifth frame of visual data corresponding to the one or more third images, wherein searching 516, by the processor 113, for one or more fourth images in the fifth frame of visual data includes initially searching 516 a region of the fifth frame of visual data corresponding to the location of the second image in the second frame of visual image data.

19. The non-transitory computer readable medium 107 of example 17, wherein the instructions further comprise instructions to: transform 512 the first frame of visual data corresponding to one or more first images 105 by applying one or more image transforms to the first frame of visual data, and wherein searching 516, by the processor 113, for one or more second images in the second frame of visual data corresponding to the one or more first images 105 comprises searching 516 for one or more second images in the second frame of visual data corresponding to one or more transformed first images 105.

20. The non-transitory computer readable medium 107 of example 19, wherein the instructions to transform 512 the first frame of visual data comprise instructions to: skew the first frame of visual data; modify an aspect ratio of the first frame of visual data; and modify a transparency level of the first frame of visual data.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for removing reflected information from within a video capture feed, comprising:
   displaying, on the display device, a first frame of visual data comprising one or more first images;
   capturing, by an image capture device when the display device displays the first frame, a second frame of visual data;
   detecting, by the processor in the second frame, a second image corresponding to one or more of the one or more first images;
   removing, from the second frame when the image capture device captures the second frame, at least some visual data corresponding to the one or more first images so as to generate a third frame of visual data from the second frame; and
   including, for rendering by an electronic device, the third frame within a visual data stream.

2. The computer-implementable method of claim 1, further comprising:
   determining a location of the second image in the second frame;
   displaying a fourth frame of visual data using the display device, the fourth frame corresponding to one or more third images;
   capturing a fifth frame of visual data using the image capture device; and
   searching, by the processor, for one or more fourth images in the fifth frame corresponding to the one or more third images, wherein searching, by the processor, for one or more fourth images in the fifth frame includes initially searching a region of the fifth frame corresponding to the location of the second image in the second frame.

3. The computer-implementable method of claim 1, further comprising:
   transforming the first frame corresponding to one or more first images by applying one or more image transforms to the first frame, wherein searching, by the processor, for one or more second images in the second frame corresponding to the one or more first images comprises searching for one or more second images in the second frame corresponding to one or more transformed first images.

4. The computer-implementable method of claim 3, wherein transforming the first frame comprises at least one of:

cropping the first frame;
skewing the first frame;
modifying an aspect ratio of the first frame; and
modifying a transparency level of the first frame.

5. The computer-implementable method of claim 3, wherein transforming the first frame comprises at least one of:
changing a saturation level of the first frame;
changing a blur level of the first frame; and
changing a brightness level of the first frame.

6. The computer-implementable method of claim 1, wherein including the third frame within a visual data stream for rendering by an electronic device comprises transmitting the audio-visual data stream to a remote endpoint.

7. The computer-implementable method of claim 1, wherein including the third frame within a visual data stream for rendering by an electronic device comprises displaying at least some of the third image frame using the display device.

8. The computer-implementable method of claim 1, wherein searching, by the processor, for one or more second images in the second frame corresponding to one or more of the one or more first images comprises searching for image data depicting an eyeglass and wherein detecting, by the processor, a second image in the second frame corresponding to the one or more first images comprises determining that the second image is at least partially bounded by image data depicting the eyeglass.

9. A teleconferencing system, comprising:
a display device;
an image capture device configured to capture a series of image data frames;
a processor coupled to the image capture device and the display device, and configured to process the series of image data frames; and
a non-transitory computer-readable storage medium storing instructions executable by the processor, the instructions when executed by the processor causes the teleconferencing system to:
display a first frame of visual data on the display device, the first frame comprising one or more first images;
capture, by the image capture device when the display device displays the first frame, a second frame of visual data;
detect, in the second frame, a second image corresponding to the one or more first images;
remove, from the second frame when the image capture device captures the second frame, at least some visual data corresponding to the one or more first images so as to generate a third frame of visual data from the second frame; and
include, for rendering by an electronic device, the third frame within a visual data stream.

10. The teleconferencing system of claim 9, wherein the instructions further comprise instructions to:
determine a location of the second image in the second frame;
display a fourth frame of visual data using the display device, the fourth frame corresponding to one or more third images;
capture a fifth frame of visual data using the image capture device; and
search for one or more fourth images in the fifth frame corresponding to the one or more third images, wherein searching, by the processor, for one or more fourth images in the fifth frame includes initially searching a region of the fifth frame corresponding to the location of the second image in the second frame.

11. The teleconferencing system of claim 10, wherein the instructions further comprise instructions to:
transform the first frame corresponding to one or more first images by applying one or more image transforms to the first frame, and wherein
the instructions to search for one or more second images in the second frame corresponding to the one or more first images comprises searching for one or more second images in the second frame corresponding to one or more transformed first images.

12. The teleconferencing system of claim 11, wherein the instructions to transform the first frame comprise instructions to:
crop the first frame;
skew the first frame;
modify an aspect ratio of the first frame; and
modify a transparency level of the first frame.

13. The teleconferencing system of claim 11, wherein the instructions to transform the first frame comprise instructions to:
change a saturation level of the first frame;
change a blur level of the first frame; and
change a brightness level of the first frame.

14. The teleconferencing system of claim 12, wherein including the third frame within a visual data stream for rendering by an electronic device comprises transmitting the audio-visual data stream to a remote endpoint.

15. The teleconferencing system of claim 9, wherein including the third frame within a visual data stream for rendering by an electronic device comprises displaying at least some of the third image frame using the display device.

16. The teleconferencing system of claim 9, wherein detecting, by the processor, a second image in the second frame corresponding to the one or more first images comprises determining that the second image is at least partially bounded by image data depicting an eyeglass.

17. A non-transitory computer-readable storage medium storing instructions executable by the processor, the instructions when executed by the processor causes the teleconferencing system to:
display, on the display device, a first frame of visual data comprising one or more first images;
capture, by an image capture device when the display device displays the first frame, a second frame of visual data;
detect, in the second frame, a second image corresponding to the one or more first images;
remove, from the second frame when the image capture device captures the second frame, at least some visual data corresponding to the one or more first images so as to generate a third frame of visual data from the second frame; and
include, for rendering by an electronic device, the third frame within a visual data stream.

18. The non-transitory computer readable medium of claim 17, wherein the instructions further comprise instructions to:
determine a location of the second image in the second frame;
display a fourth frame of visual data using the display device, the fourth frame corresponding to one or more third images;
capture a fifth frame of visual data using the image capture device; and search, by the processor, for one or more fourth images in the fifth frame corresponding to the one or more third images, wherein searching, by the processor, for one or more fourth images in the fifth frame includes initially searching a region of the fifth frame corresponding to the location of the second image in the second frame.

19. The non-transitory computer readable medium of claim 17, wherein the instructions further comprise instructions to:
   transform the first frame corresponding to one or more first images by applying one or more image transforms to the first frame, and
   wherein searching, by the processor, for one or more second images in the second frame corresponding to the one or more first images comprises searching for one or more second images in the second frame corresponding to one or more transformed first images.

20. The non-transitory computer readable medium of claim 19, wherein the instructions to transform the first frame comprise instructions to:
   skew the first frame;
   modify an aspect ratio of the first frame; and
   modify a transparency level of the first frame.

\* \* \* \* \*